United States Patent
Ahn et al.

(10) Patent No.: US 7,974,198 B2
(45) Date of Patent: Jul. 5, 2011

(54) APPARATUS AND METHOD FOR GUARANTEEING QOS TRAFFIC RATE IN MOBILE COMMUNICATION SYSTEM

(75) Inventors: Byung-Chan Ahn, Seoul (KR); Jang-Won Park, Yongin-si (KR); Young-Soon Lee, Yongin-si (KR); Eun-Jin Lee, Suwon-si (KR); Soo-Yeul Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 12/012,430

(22) Filed: Jan. 31, 2008

(65) Prior Publication Data

US 2008/0186884 A1 Aug. 7, 2008

(30) Foreign Application Priority Data

Feb. 1, 2007 (KR) .................. 10-2007-0010365

(51) Int. Cl.
H04W 4/00 (2009.01)
(52) U.S. Cl. ............... 370/232; 370/328; 455/452.2; 455/561
(58) Field of Classification Search .................. None
See application file for complete search history.

(56) References Cited

U.S. PATENT DOCUMENTS

| | | | |
|---|---|---|---|
| 6,996,061 B2 * | 2/2006 | Yang et al. | 370/233 |
| 7,460,474 B2 * | 12/2008 | Ishii et al. | 370/230 |
| 7,596,090 B2 * | 9/2009 | Black | 370/234 |
| 7,633,863 B2 * | 12/2009 | Kim et al. | 370/230 |
| 7,668,110 B2 | 2/2010 | Seol et al. | |
| 2004/0071081 A1 * | 4/2004 | Rosenfled | 370/229 |
| 2007/0099647 A1 * | 5/2007 | Lee et al. | 455/522 |
| 2007/0121498 A1 * | 5/2007 | Park et al. | 370/229 |
| 2007/0153801 A1 * | 7/2007 | Sung et al. | 370/395.4 |
| 2007/0183320 A1 * | 8/2007 | Chen et al. | 370/229 |
| 2008/0175147 A1 * | 7/2008 | Lakkakorpi | 370/230 |

FOREIGN PATENT DOCUMENTS

| | | |
|---|---|---|
| KR | 100246618 B1 | 12/1999 |
| KR | 1020040071709 A | 8/2004 |
| KR | 1020040097622 A | 11/2004 |
| KR | 1020070005744 A | 1/2007 |

OTHER PUBLICATIONS

Niyato, D.; Hossain, E.; , "Service differentiation in broadband wireless access networks with scheduling and connection admission control: a unified analysis," Wireless Communications, IEEE Transactions on , vol. 6, No. 1, pp. 293-301, Jan. 2007.*

(Continued)

*Primary Examiner* — Daniel J Ryman
*Assistant Examiner* — Brian Roberts

(57) ABSTRACT

Apparatus and method for guaranteeing a Quality of Service (QoS) traffic rate in a mobile communication system are provided. The scheduling method for guaranteeing a QOS traffic rate in a mobile communication system includes calculating a total sum of traffic rates based on a channel change and a total sum of sustained traffic rates; calculating a weighted traffic rate using the traffic rate based on the channel change and the sustained traffic rate when the sustained traffic rate does not meet the QoS traffic rate; and determining a service priority using the weighted traffic rate. Therefore, the minimum reserved traffic rate and the maximum sustained traffic rate can be assured.

14 Claims, 6 Drawing Sheets

OTHER PUBLICATIONS

Settembre, M.; Puleri, M.; Garritano, S.; Testa, P.; Albanese, R.; Mancini, M.; Lo Curto, V.; , "Performance analysis of an efficient packet-based IEEE 802.16 MAC supporting adaptive modulation and coding," Computer Networks, 2006 International Symposium on pp. 11-16.*

Niyato, D.; Hossain, E.; , "Queue-aware uplink bandwidth allocation and rate control for polling service in IEEE 802.16 broadband wireless networks," Mobile Computing, IEEE Transactions on , vol. 5, No. 6, pp. 668-679, Jun. 2006.*

Xiaofeng Bai; Shami, A.; Meerja, K.A.; Assi, C.; , "WLC22-3: New Distributed QoS Control Scheme for IEEE 802.16 Wireless Access Networks," Global Telecommunications Conference, 2006. GLOBECOM '06. IEEE , vol., No., pp. 1-5, Nov. 27, 2006-Dec. 1, 2006.*

Office Action dated Jul. 30, 2010 in connection with Korean Patent Application No. 10-2007-0010365.

* cited by examiner

APPARATUS AND METHOD FOR GUARANTEEING QOS TRAFFIC RATE IN MOBILE COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Feb. 1, 2007 and assigned Serial No. 2007-10365, the disclosure of which is herein incorporated by reference.

TECHNICAL FIELD OF THE INVENTION

The present invention relates generally to an apparatus and a method for Quality of Service (QoS) in a mobile communication system. More particularly, the present invention relates to an apparatus and a method for guaranteeing a minimum reserved traffic rate and a maximum sustained traffic rate in the mobile communication system.

BACKGROUND OF THE INVENTION

Recently, mobile communication standards are stressing Quality of Service (QoS) to assure traffic rate and latency required in an application, QoS differentiation on a user profile basis, and service parameters defined in connection admission. In a mobile communication system, the QoS is guaranteed in association with various schemes such as Connection Admission Control (CAC) for determining whether to admit the connection, flow control (e.g., leaky bucket) for controlling a source traffic rate in accordance with a network condition, and packet scheduling for controlling usage of radio channels between a base station and a terminal, by referring to QoS parameters from a user and the network condition.

Particularly, the Institute of Electrical and Electronics Engineers (IEEE) 802.16 standard provides quite detailed and sub-divided features in the QoS definition and differentiation. For example, the IEEE 802.16 standard defines QoS parameters of a minimum reserved traffic rate and a maximum sustained traffic rate. Also, the IEEE 802.16 standard supports Unsolicited Grant Service (UGS), real-time Polling Services (rtPS), and non-real-time Polling Services (nrtPS).

The minimum reserved traffic rate is used to meet a minimum traffic rate required in the application of real time service, or to keep a packet transmission interval of non-real-time service below a certain interval. The UGS connection of the IEEE 802.16 standard periodically allocates slots for the minimum reserved traffic rate in an unsolicited pattern. Accordingly, there are no more subjects to be considered to meet the minimum reserved traffic rate in the UGS connection. In the rtPS connection of the IEEE 802.16 standard, statistically, it is highly likely to satisfy the minimum traffic rate through the CAC. The application frequently using the rtPS connection is a video streaming service. The video streaming generates burst traffic at a video codec at intervals. Hence, the minimum traffic rate can be fully satisfied when the chance to select is guaranteed by acquiring several tokens at intervals. The nrtPS connection of the IEEE 802.16 standard, which has no required latency, exhibits the traffic rate in proportion to the channel condition. This is scheduled by a packet scheduler (e.g., a proportional fair scheduler). To raise the possibility of the traffic rate satisfaction, the packet scheduler multiplies by a weighting factor greater than 1 when calculating the priority. When the multiplied weighting factor is too great, the wireless bandwidth is monopolized. Thus, the traffic rate becomes too high and it may be problematic in view of the fairness. By contrast, when the multiplied weighting factor is too small, there would be not enough chances to select meet the minimum reserved traffic rate. Therefore, to effectively meet the minimum reserved traffic rate in the nrtPS connection, a method for determining an adequate weighting factor is required.

The maximum sustained traffic rate is used to provide the QoS based on a level of a subscriber. When the limited bandwidth is fairly allocated to the subscribers, the subscriber of the better channel condition acquires the higher traffic rate. When the traffic rate allocated to the subscriber is restricted, it is possible to allocate the small bandwidth to the subscriber who pays smaller fee in the good channel condition and then to allocate the remaining bandwidth to the subscriber who requires the high traffic rate and pays the considerable fee. That is, the subscriber requiring the high QoS acquires the high maximum sustained traffic rate while paying the considerable fee. Yet, the maximum sustained traffic rate is used to limit the traffic rate in accordance with the paid fee, rather than to guarantee the traffic rate.

Therefore, what are needed are an apparatus and a method for guaranteeing the minimum reserved traffic rate and the maximum sustained traffic rate in the non-real-time service of the mobile communication system.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide an apparatus and a method for QoS in a mobile communication system.

Another aspect of the present invention is to provide an apparatus and a method for calculating a weight which meets a minimum reserved traffic rate and a maximum sustained traffic rate in a mobile communication system.

Yet another aspect of the present invention is to provide an apparatus and a method for scheduling using a weight which meets a minimum reserved traffic rate and a maximum sustained traffic rate in a mobile communication system.

The above aspects are achieved by providing a scheduling method for guaranteeing a Quality of Service (QoS) traffic rate in a mobile communication system. The scheduling method includes calculating a total sum of traffic rates based on a channel change and a total sum of sustained traffic rates; calculating a weighted traffic rate using the traffic rate based on the channel change and the sustained traffic rate when the sustained traffic rate does not meet the QoS traffic rate; and determining a service priority using the weighted traffic rate.

According to one aspect of the present invention, a scheduling apparatus for guaranteeing a QoS traffic rate in a mobile communication system includes a traffic information calculator for calculating a total sum of traffic rates based on a channel change; a sustained traffic calculator for calculating a total sum of sustained traffic rates on a channel basis by accumulating the traffic rates; a weight calculator for calculating a weighted traffic rate using the traffic rate based on the channel change and the sustained traffic rate when the sustained traffic rate does not meet the QoS traffic rate; and a priority determiner for determining a service priority using the weighted traffic rate.

According to another aspect of the present invention, a method for guaranteeing a QoS traffic rate in a mobile communication system includes increasing a certain allocated token when a data size transmitted in a previous period is greater than a data size transmitted in a period at the QoS traffic rate; allocating the token to a corresponding to the channel connection; and scheduling using the allocated token and decreasing a token of a corresponding token.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides an apparatus and a method for satisfying a minimum reserved traffic rate and a maximum sustained traffic rate in a mobile communication system. Herein, the minimum reserved traffic rate and the maximum sustained traffic rate are referred to as QoS traffic rates.

Figure 1:
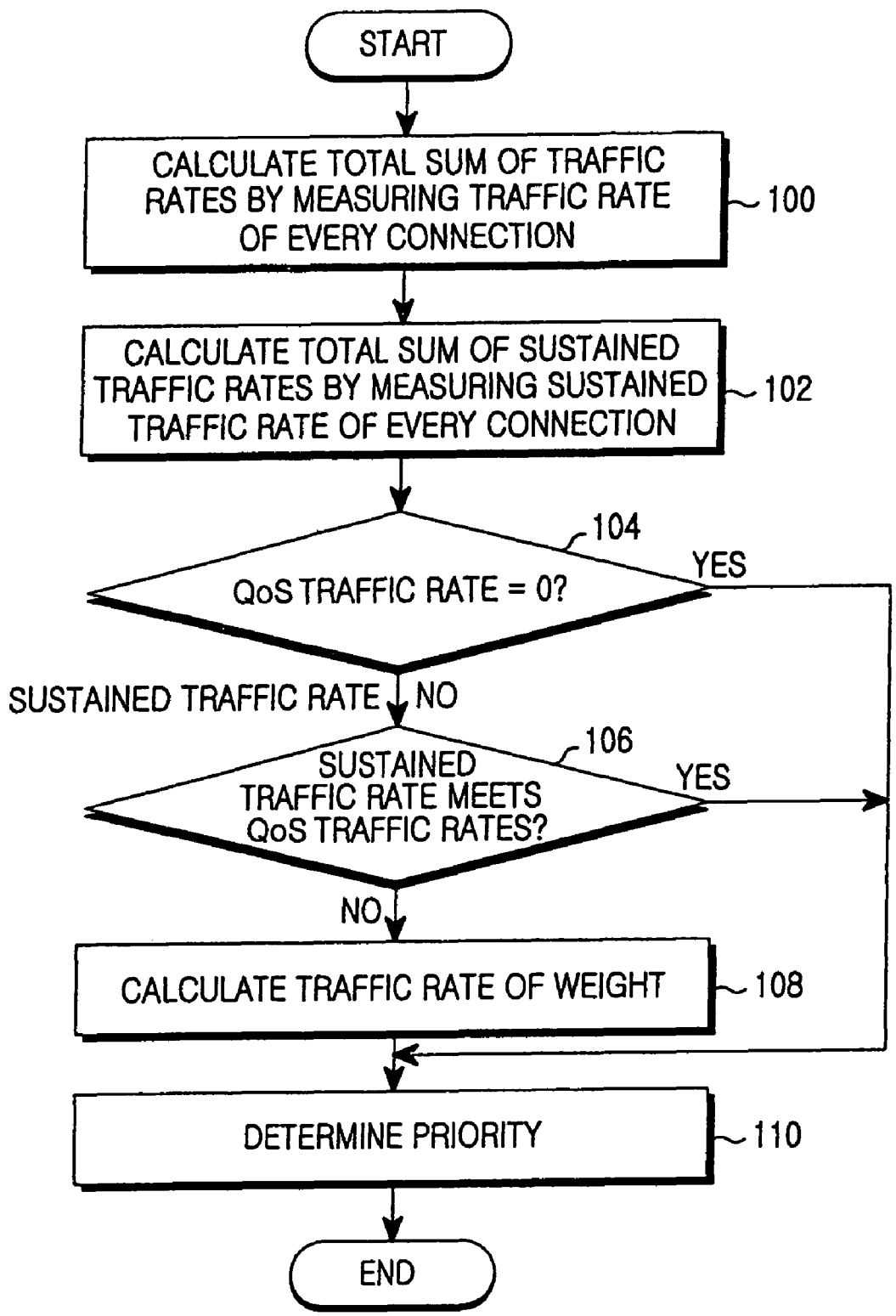
FIG. 1 is a flowchart of a base station to guarantee QoS traffic rates using a weight in a mobile communication system according to an embodiment of the present invention.
Figure 2:
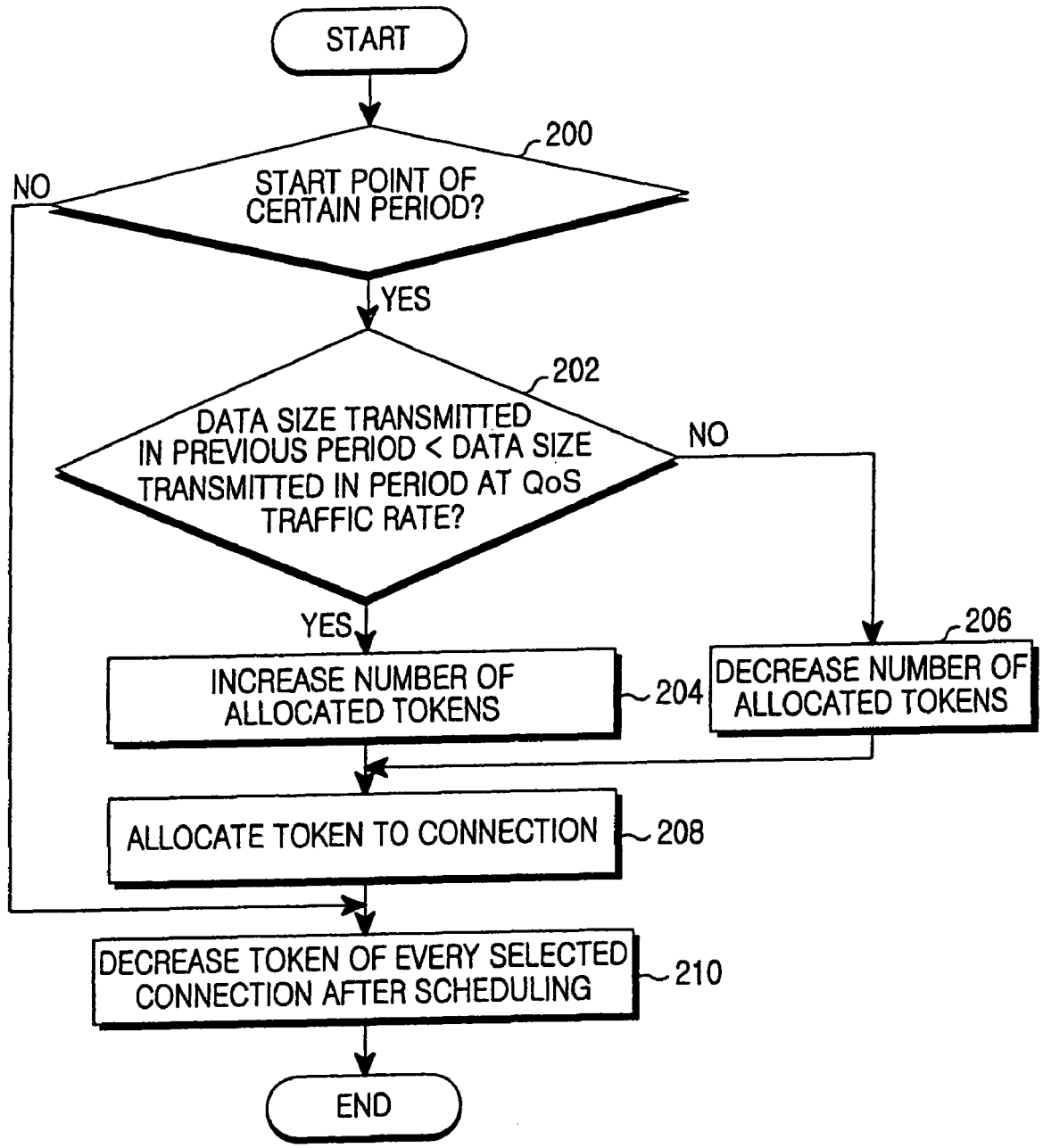
FIG. 2 is a flowchart of the base station to guarantee the QoS traffic rates using token allocation in the mobile communication system according to an embodiment of the present invention.
Figure 3:
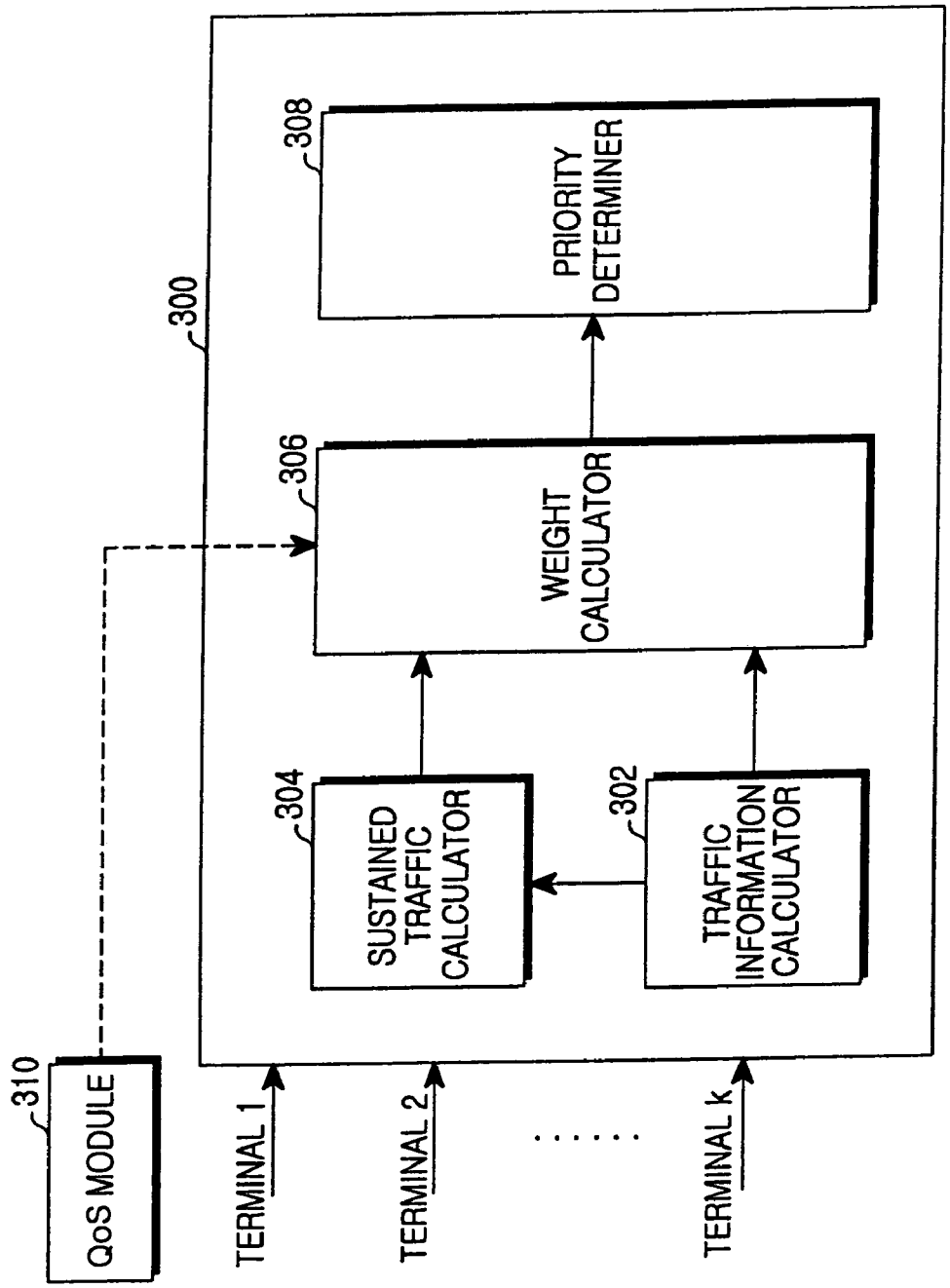
FIG. 3 a block diagram of an apparatus for guaranteeing the QoS traffic rates in the mobile communication system according to an embodiment of the present invention.

A method for satisfying the QoS traffic rate by multiplying by an adequate weight is explained in FIG. 1, a method for determining priority to meet the QoS traffic rates by periodically allocating tokens is explained in FIG. 2, and an apparatus for scheduling based on the priority which meets the QoS traffic rates is explained in FIG. 3.

FIG. 1 is a flowchart of a base station to guarantee QoS traffic rates using a weight in a mobile communication system according to an embodiment of the present invention.

In step 100, the base station calculates the total sum $$\sum_i R_{c,k}$$

of the traffic rates by measuring the traffic rates $R_{c,k}$ based on the channel change for every connection with terminals. The traffic can be calculated using Channel Quality Indicator (CQI) information for carrying the reception quality or UpLink (UL) Tx power. Herein, the traffic rates $R_{c,k}$ are determined based on the channel change, c is a channel status index, and k is a connection index.

In step 102, the base station calculates a total sum $$\sum_i R_{t,k}$$

of the mean traffic rates by calculating the sustained traffic rate $R_{t,k}$ of every connection with the terminals. Herein, the sustained traffic rate $R_{t,k}$ is on the time basis and can be acquired using the result of the scheduling. The calculation method of the sustained traffic rate varies depending on its definition. The IEEE 802.16 standard has a definition similar to a moving average. To guarantee the QoS, it is required that a packet scheduler perform a greater amount of calculation. For the accurate moving average calculation, a Digital Signal Processor (DSP), which requires a high processing load, is not suitable. Accordingly, the sustained traffic rate is calculated simply using an exponential average (1-tap IIR filtering).

In step 104, the base station determines whether the QoS traffic rates are 0 kbps. When the QoS traffic rates are 0 kbps, the base station determines priority using the acquired traffic rate based on the channel change and the mean traffic rate in step 110. Herein, the QoS traffic rates of 0 kbps signify no definition of the QoS traffic rates. Thus, in the scheduling, there is no need to meet the QoS traffic rates.

When the QoS traffic rates are not 0 kbps, that is, when the QoS traffic rates are defined, the base station determines whether the mean traffic rate meets the QoS traffic rates in step 106. When the mean traffic rate does not meet the QoS traffic rates, the base station calculates the traffic rate of a weight using the total sum $$\sum_i R_{t,k}$$

of the mean traffic rates and the total sum $$\sum_i R_{c,k}$$

of the traffic rates based on the channel change using Equation (1) in step 108.

As the priority based on the QoS traffic rates becomes similar with respect to the channel connection with the terminals, a higher mean traffic rate $R_{t,k}$ can be acquired when $R_{c,k}$ is greater than the other connections. In conclusion, when $R_{aux,c,k}$ is defined as the product of $R_{c,k}$ and $f_k$, a new sustained traffic rate $R_{aux,t,k}$ meets Equation 1:

$$\frac{R_{aux,c,k}}{\sum_i R_{c,i}} = \frac{(R_{aux,t,k})^{\alpha_t}}{\sum_i (R_{t,i})^{\alpha_t}}. \quad [\text{Eqn. 1}]$$

In Equation 1, $R_{aux,c,k}$ is a weighted traffic rate by multiplying $R_{c,k}$ by the weight $f_k$, $R_{c,k}$ is the traffic rate based on the channel change, $R_{aux,t,k}$ is a weighted sustained traffic rate, $R_{t,k}$ is the mean traffic rate, and $\alpha_t$ is a factor for taking into account a fairness between the channel connections. As $\alpha_t$ is close to zero, the fairness is not ensured but the integrated traffic throughput increases. By contrast, when $\alpha_t$ becomes greater, the higher fairness is ensured but the integrated traffic throughput decreases.

When the sustained traffic rate does not meet the QoS traffic rates, the weighted traffic rate is calculated by changing $R_{aux,t,k}$ to the defined QoS traffic rates in Equation 1.

If Equation 1 takes into account a multi-user diversity gain, it is expressed as Equation 2:

$$R_{aux,c,k} = F_{c,k} \times \sum_i R_{c,i} \times \frac{(R_{aux,t,k})^{\alpha_t}}{\sum_i (R_{t,i})^{\alpha_t}}. \quad [\text{Eqn. 2}]$$

In Equation 2, $R_{aux,c,k}$ is the weighted traffic rate by multiplying $R_{c,k}$ by the weight $f_k$, $R_{c,k}$ is the traffic rate based on the channel change, $R_{aux,t,k}$ is the weighted sustained traffic rate, $R_{t,k}$ is the mean traffic rate, $F_{c,k}$ is the multi-user diversity gain, and $\alpha_t$ is the factor for taking into account the fairness between the channel connections.

In step 110, the base station calculates the priority using the weighted traffic rate. The priority is calculated using Equation 3 or Equation 4. Equation 3 is used when the mean traffic rate $R_{t,k}$ is smaller than the minimum reserved traffic rate or greater than the maximum sustained traffic rate (when the sustained traffic rate does not meet the QoS traffic rates), and Equation 4 is used when the mean traffic rate $R_{t,k}$ is greater than the minimum reserved traffic rate or smaller than the maximum sustained traffic rate (when the sustained traffic rate meets the QoS traffic rates):

$$P_k = \frac{P_{aux,c,k}}{(R_{t,k})^{\alpha_t}}. \quad [\text{Eqn. 3}]$$

In Equation 3, $P_k$ is the priority value, $R_{aux,c,k}$ is the weighted traffic rate by multiplying $R_{c,k}$ by the weight $f_k$, $R_{t,k}$ is the mean traffic rate, and $\alpha_t$ is the factor for taking into account the fairness between the channel connections.

$$P_k = \frac{R_{c,k}}{(R_{t,k})^{\alpha_t}} \quad [\text{Eqn. 4}]$$

In Equation 4, $P_k$ is the priority value, $R_{c,k}$ is the traffic rate based on the channel change, $R_{t,k}$ is the mean traffic rate, and $\alpha_t$ is the factor for taking into account the fairness between the channel connections. For reference, when the sustained traffic rate is greater than the maximum sustained traffic rate in the scheduling based on the real-time connection and the priority value is set to 0, it can be used not only in the non-real-connection but also in the real-time connection.

For instance, when it is assumed that every terminal does not have the QoS traffic rates, three terminals have the same channel condition (that is, every terminal has the same $R_{c,k}$), and the maximum sector throughput is 3 Mbps, each terminal has the traffic rate of 1 Mbps. It is assumed that each terminal services at the traffic rate of 1 Mbps, the first terminal has the QoS traffic rate of 1.5 Mbps, and the other two terminals have the QoS traffic rate of 0 Kbps. In this case, with the maximum sector throughput of 3 Mbps traffic rate, each terminal transmit at $2R_{c,k}$, $R_{c,k}$ and $R_{c,k}$ respectively. In other words, the first terminal has the sustained traffic rate $2R_{c,k}$ and the other two terminals have the sustained traffic rate $R_{c,k}$. Accordingly, the final traffic rate of the terminals is $$1.5\ Mbps\left(3\ Mbps \times \frac{2}{4}\right), 0.75\ Mbps\left(3\ Mbps \times \frac{1}{4}\right),$$

$$\text{and } 0.75\ Mbps\left(3\ Mbps \times \frac{1}{4}\right)$$

based on Equation 1, and the final traffic rate of the first terminal guarantees the QoS traffic rate of 1.5 Mbps.

Next, the base station finishes this process.

In case where the minimum reserved traffic rate is required as in the nrtPS connection of the IEEE 802.16 standard, when the traffic rate based on the channel change is smaller than the minimum reserved traffic rate, a weight greater than 1 is multiplied. Otherwise, a weight of 1 is multiplied. When the minimum reserved traffic rate is not necessary as in a Best Effort (BE) connection of the IEEE 802.16 standard, 1 is multiplied. However, this does not ensure the minimum reserved traffic rate. Since the traffic rate varies based on the channel condition, it is needed to fully consider the weight for the priority value of Equation 3 to accurately ensure the necessary minimum reserved traffic rate. Therefore, by applying the weight which meets the condition of Equation 1, the minimum reserved traffic rate (the QoS traffic rate) can be assured.

In FIG. 1, high performance is exhibited in relation to the non-real-time connection traffic rate. Now, the method for guaranteeing the QoS traffic rates with respect to the real-time connection traffic rate is described by referring to FIG. 2. The priority in the real-time connection is calculated based on Equation 5:

$$P_{k,rt} = F_{c,k} \times F_{t,k} \times F_{l,k}. \quad [\text{Eqn. 5}]$$

In Equation 5, $F_{c,k}$ reflects the channel change and is calculated as $$F_{c,k} = \left(\frac{R_{c,k}}{\overline{R_{c,k}}}\right)^{\alpha_c}.$$

$R_{c,k}$ is the traffic rate based on the channel change and $\overline{R_{c,k}}$ is the average rate according to the time of $R_{c,k}$. $\alpha_c$ is a weighting factor to determine the range of the reflection of the channel status. $F_{t,k}$, which ensures the minimum reserved traffic rate, has a great value when the recent sustained traffic rate is smaller than the minimum reserved traffic rate. $F_{l,k}$, which ensures the maximum latency, has a great value when the latency of the recently transmitted packet is close to or greater than the maximum latency.

FIG. 2 is a flowchart of the base station to guarantee the QoS traffic rates using token allocation in the mobile communication system according to an embodiment of the present invention.

In step 200, the base station determines whether it is a start point of a certain period. At the start point of the period, the base station compares a size of data transmitted in the previous period with a size of data transmitted in the period at the QoS traffic rate in step 202. When the data size of the previous period is smaller than the data size of the period at the QoS traffic rate, the base station increases the number of allocated tokens by one in step 204. When the data size of the previous period is greater than the data size of the period at the QoS traffic rate, the base station decreases the number of allocated tokens by one in step 206. This is to allocate the tokens to guarantee the selection chance by periods and then to allow a higher priority as the number of the tokens increases.

In step 208, the base station allocates the token acquired by comparing the data size transmitted the previous period with the data size transmitted in the period at the QoS traffic rate. Herein, given that the number of the remaining tokens in every frame is $T_k$, $F_{t,k}$ is acquired from the increased/decreased $T_k$ using Equation 4.

In step 210, the base station decreases the tokens of every selected connection by one after the scheduling.

Next, the base station finishes this process.

FIG. 3 is a block diagram of an apparatus for guaranteeing the QoS traffic rates in the mobile communication system according to an embodiment of the present invention. Herein, the apparatus for guaranteeing the QoS traffic rates is referred to as a scheduler.

The scheduler 300 of FIG. 3 includes a sustained traffic calculator 304, a traffic information calculator 302, a weight calculator 306, and a priority determiner 308.

The traffic information calculator 302 calculates the traffic rate based on the channel change in every connection with the terminals using the CQI information for carrying the reception quality or the UL Tx power, and then outputs the traffic information to the sustained traffic calculator 304 and the weight calculator 306.

The sustained traffic calculator 304 can acquire the sustained traffic rate using the traffic information provided from the traffic information calculator 302. The sustained traffic rate is calculated using the moving average or the exponential averaging (1-tap IIR filtering) and output to the weight calculator 306.

When the QoS traffic rate is greater than the sustained traffic rate, the weight calculator 306 calculates the weight to acquire the QoS traffic rate using the total sum of the sustained traffic rates, the total sum of the traffic rates based on the channel change, and the information relating to the QoS traffic rates (the minimum reserved traffic rate and the maximum sustained traffic rate) provided from a QoS module 310 which is the upper layer of the scheduler 300. The weight to acquire the QoS traffic rates is calculated using Equation 1.

The priority determiner 308 calculates the priority using the weight traffic rate provided from the weight calculator 306. The priority is calculated using Equation 3 or Equation 4. Equation 3 is used when the sustained traffic rate is smaller than the QoS traffic rate, and Equation 4 is used when the sustained traffic rate is greater than the QoS traffic rate.

Figure 4:
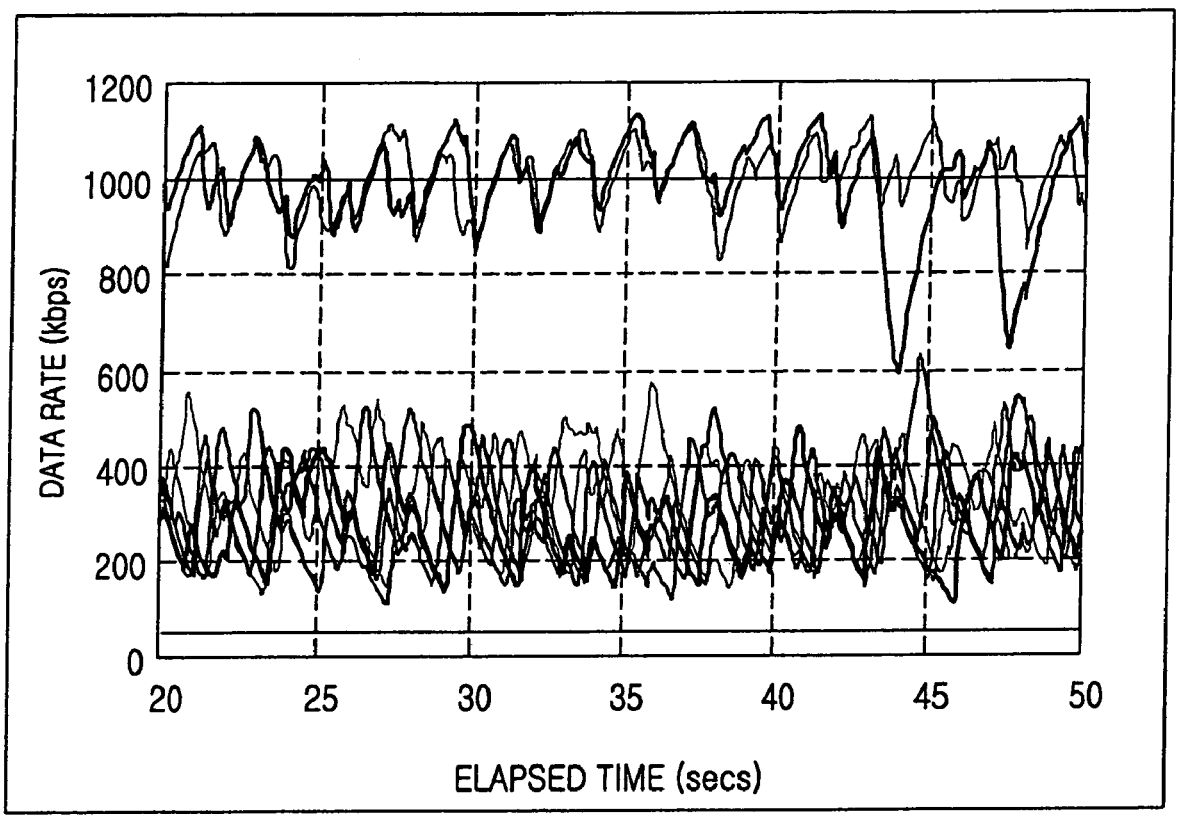
FIG. 4 is a graph of a minimum reserved traffic rate using the token allocation according to an embodiment of the present invention.
Figure 5:
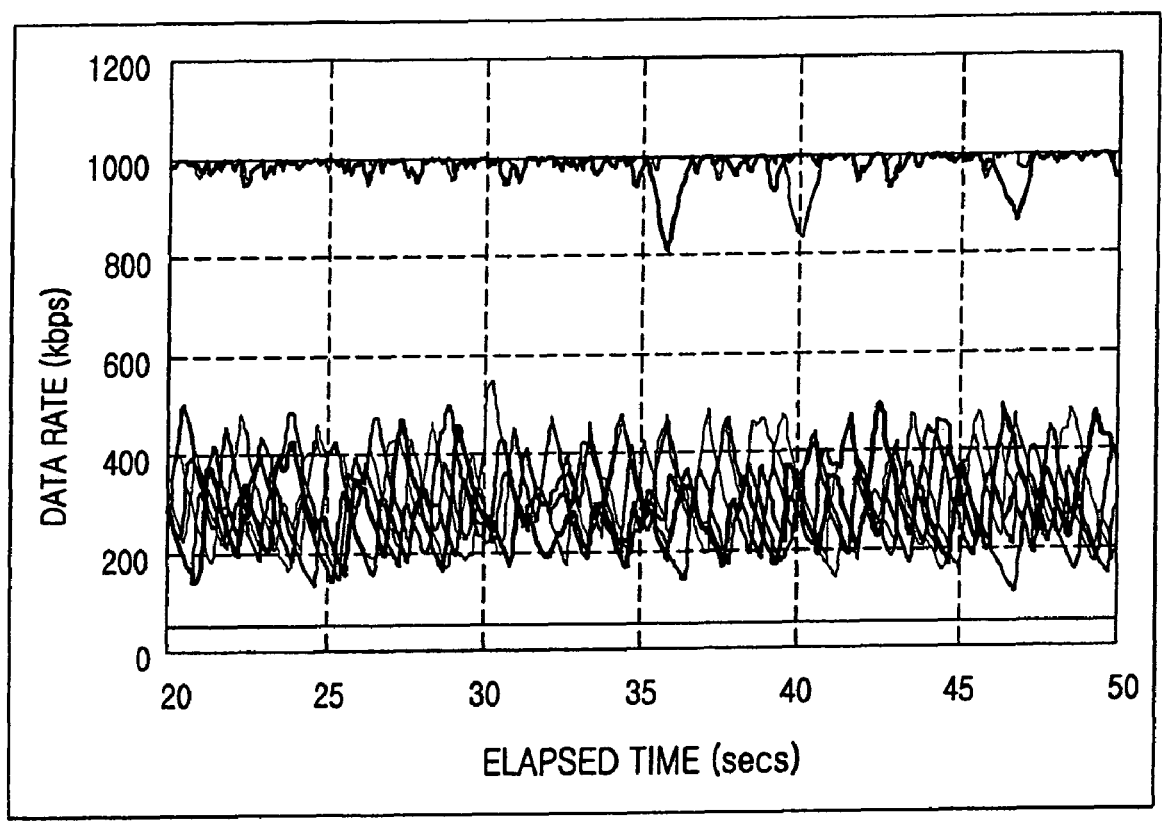
FIG. 5 is a graph of the minimum reserved traffic rate using the weight according to an embodiment of the present invention.

FIGS. 4 and 5 are graphs of the minimum reserved traffic rate according to an embodiment of the present invention. In the simulation environment, eight terminals have the same channel in one sector and generate the channel independently. Two terminals have the relatively high minimum reserved traffic rate of 1 Mbps. Without considering the minimum reserved traffic rate, the terminals have the sustained traffic rate of 500 kbps. The remaining six terminals have the minimum reserved traffic rate of 50 kbps. In FIG. 4, a preset number of tokens are allocated by periods and then the priority is increased in proportion to the number of the tokens. The number of the tokens is the value calculated to meet the minimum reserved traffic rate. Generally, every connection traffic rate exhibits the great change. As one can see, the minimum reserved traffic rate is not satisfied in most of the regions. In FIG. 5, the connection traffic rate exhibits the little change while the minimum reserved traffic rate is well supported according to the present invention.

Figure 6:
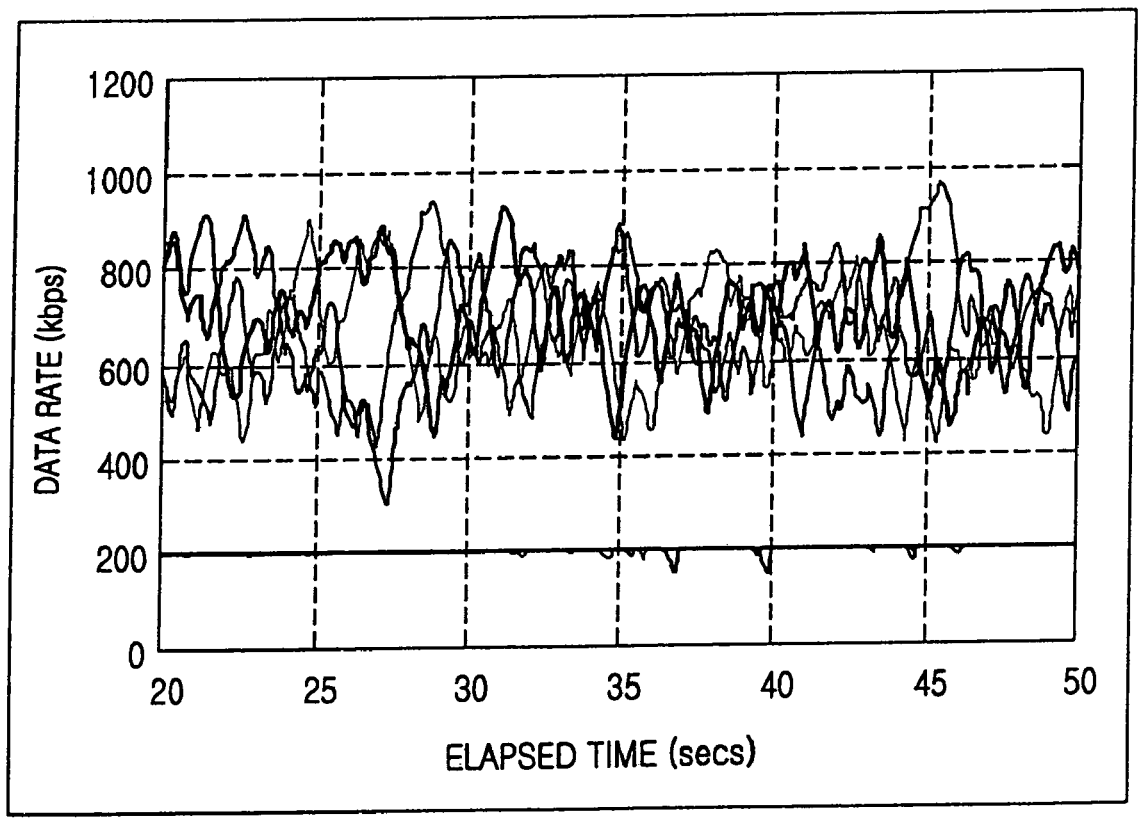
FIG. 6 is a graph of a maximum sustained traffic rate using the weight according to an embodiment of the present invention.

FIG. 6 shows the traffic rate change when the maximum sustained traffic rate is applied according to an embodiment of the present invention. In the simulation environment, eight terminals have the same channel in one sector and generate the channel independently. Four terminals have the relatively low maximum sustained traffic rate of 200 kbps. Without considering the maximum sustained traffic rate, the sustained traffic rate is 500 kbps. No maximum sustained traffic rate is applied to the remaining four terminals. As one can see, the terminals of the low maximum sustained traffic rate are stably limited to the traffic rate.

The method using the adequate weighting factor of FIG. 1 is suitable for the packet scheduler which schedules the non-real-time connections to acquire the traffic rate in proportion to the channel condition. The method for periodically allocating the tokens of FIG. 2 is suitable for the packet scheduler which schedules the real-time connections in which the original source traffic has the bursty traffic feature.

As set forth above, since the weighted traffic rate is calculated to guarantee the minimum reserved traffic rate and the maximum sustained traffic rate in the mobile communication system, the QoS can be satisfied.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A scheduling method of a base station for guaranteeing a Quality of Service (QoS) traffic rate in a mobile communication system, the method comprising:

calculating, by a traffic information calculator, a total sum of traffic rates, each traffic rate being based on a channel change, and calculating, by a sustained traffic calculator, a total sum of mean traffic rates;

calculating, by a weight calculator, a weighted traffic rate for a mobile station using the total sum of traffic rates based on the channel changes and the total sum of mean traffic rates, when a mean traffic rate of the mobile station does not meet a QoS traffic rate of the mobile station; and determining, by a priority determiner, a service priority using the weighted traffic rate.

2. The scheduling method of claim 1, wherein each traffic rate based on the channel change is calculated, by the traffic information calculator, based on Channel Quality Indicator (CQI) information or UpLink (UL) Tx power information.

3. The scheduling method of claim 1, further comprising:

acquiring, by the sustained traffic calculator, the mean traffic rate of the mobile station using an infinite impulse response (IIR) filter.

4. The scheduling method of claim 1, further comprising:
determining, by the priority determiner, the service priority using the total sum of traffic rates based on the channel changes and the total sum of mean traffic rates, when the mean traffic rate of the mobile station meets the QoS traffic rate.

5. The scheduling method of claim 1, wherein the weighted traffic rate is calculated by the weight calculator using the following equation:

$$\frac{R_{aux,c,k}}{\sum_i R_{c,i}} = \frac{(R_{aux,t,k})^{\alpha_t}}{\sum_t (R_{t,i})^{\alpha_t}}$$

where i is an index for a mobile station, $R_{aux,c,k}$ is a weighted traffic rate of a kth mobile station obtained by multiplying $R_{c,k}$ by a weight $f_k$, $R_{c,k}$ is a traffic rate of the kth mobile station based on the channel change, $R_{aux,t,k}$ is a weighted mean traffic rate of the kth mobile station, $R_{t,k}$ is a mean traffic rate of the kth mobile station, $R_{c,i}$ is a traffic rate of an ith mobile station based on the channel change, $R_{t,i}$ is a mean traffic rate of the ith mobile station, and $\alpha_t$ is a factor for taking into account a fairness between channel connections.

6. The scheduling method of claim 5, wherein, when the mean traffic rate of the kth mobile station does not meet a QoS traffic rate of the kth mobile station, the weighted mean traffic rate $R_{aux,t,k}$ of the kth mobile station is set to the QoS traffic rate of the kth mobile station by the weight calculator.

7. The scheduling method of claim 1, wherein the service priority is determined, by the priority determiner, using the following equation:

$$P_k = \frac{P_{aux,c,k}}{(R_{t,k})^{\alpha_t}}$$

where $P_k$ is a priority value of a kth mobile station, $R_{aux,c,k}$ is a weighted traffic rate of the kth mobile station after multiplying $R_{c,k}$ by a weight $f_k$, $R_{c,k}$ is a traffic rate of the kth mobile station based on a channel change, $R_{t,k}$ is a mean traffic rate of the kth mobile station, and $\alpha_t$ is a factor for taking into account a fairness between channel connections.

8. A scheduling apparatus for guaranteeing a Quality of Service (QoS) traffic rate in a mobile communication system, the apparatus comprising:
a traffic information calculator circuit configured to calculate a total sum of traffic rates, each traffic rate being based on a channel change;
a sustained traffic calculator configured to calculate a total sum of mean traffic rates on a channel basis;
a weight calculator configured to calculate a weighted traffic rate for a mobile station using the total sum of traffic rates based on the channel changes and the total sum of mean traffic rates, when a mean traffic rate of the mobile station does not meet a QoS traffic rate of the mobile station; and
a priority determiner configured to determine a service priority using the weighted traffic rate.

9. The scheduling apparatus of claim 8, wherein each traffic rate based on the channel change is calculated based on Channel Quality Indicator (CQI) information or UpLink (UL) Tx power information.

10. The scheduling apparatus of claim 8, wherein the mean traffic rate of the mobile station is acquired through digital signal processing using an infinite impulse response (IIR) filter.

11. The scheduling apparatus of claim 8, further comprising:
the priority determiner configured to determine the service priority using the total sum of traffic rates based on the channel changes and the mean traffic rates, when the mean traffic rate of the mobile station meets the QoS traffic rate of the mobile station.

12. The scheduling apparatus of claim 8, wherein the weight traffic rate is calculated using the following equation:

$$\frac{R_{aux,c,k}}{\sum_i R_{c,i}} = \frac{(R_{aux,t,k})^{\alpha_t}}{\sum_t (R_{t,i})^{\alpha_t}}$$

where i is an index for a mobile station, $R_{aux,c,k}$ is a weighted traffic rate of a kth mobile station obtained by multiplying $R_{c,k}$ by a weight $f_k$, $R_{c,k}$ is a traffic rate of the kth mobile station based on the channel change, $R_{aux,t,k}$ is a weighted mean traffic rate of the kth mobile station, $R_{t,k}$ is a mean traffic rate of the kth mobile station, $R_{c,i}$ is a traffic rate of an ith mobile station based on the channel change, $R_{t,i}$ is a mean traffic rate of the ith mobile station, and $\alpha_t$ is a factor for taking into account a fairness between channel connections.

13. The scheduling apparatus of claim 12, wherein, when the mean traffic rate of the kth mobile station does not meet a QoS traffic rate of the kth mobile station, the weighted mean traffic rate $R_{aux,t,k}$ of the kth mobile station is set to the QoS traffic rate of the kth mobile station.

14. The scheduling apparatus of claim 8, wherein the service priority is determined using the following equation:

$$P_k = \frac{R_{aux,c,k}}{(R_{t,k})^{\alpha_t}}$$

where $P_k$ is a priority value of a kth mobile station, $R_{aux,c,k}$ is a weighted traffic rate of the kth mobile station after multiplying $R_{c,k}$ by a weight $f_k$, $R_{c,k}$ is a traffic rate of the kth mobile station based on a channel change, $R_{t,k}$ is a mean traffic rate of the kth mobile station, and $\alpha_t$ is a factor for taking into account a fairness between channel connections.

* * * * *